United States Patent [19]

Kallstrom

[11] Patent Number: 4,812,844
[45] Date of Patent: Mar. 14, 1989

[54] WINDSHEAR DETECTION INDICATOR SYSTEM

[76] Inventor: Walter H. Kallstrom, 1303 NE. Sunset Way, Poulsbo, Wash. 98370

[21] Appl. No.: 14,585

[22] Filed: Feb. 13, 1987

[51] Int. Cl.$^4$ .............................................. G08G 5/00
[52] U.S. Cl. .................................. 340/949; 73/178 T; 73/189; 340/968
[58] Field of Search ............... 340/949, 950, 953, 968, 340/691; 73/178 T, 178 R, 188, 189; 244/114 R; 364/434

[56] References Cited

U.S. PATENT DOCUMENTS

| | | | |
|---|---|---|---|
| 910,035 | 1/1909 | Winder | 73/189 |
| 1,236,296 | 8/1917 | Hanks | 73/189 |
| 1,342,860 | 6/1920 | Mortimer et al. | 340/949 |
| 1,644,547 | 10/1927 | Smith | 340/949 |
| 3,691,829 | 9/1972 | Perry | 73/189 |
| 3,986,396 | 10/1976 | Raymond | 73/189 |
| 4,093,937 | 6/1978 | Habinger | 340/949 |
| 4,201,973 | 5/1980 | Jackson et al. | 340/949 |
| 4,295,139 | 10/1981 | Arpino | 340/949 |
| 4,318,076 | 3/1982 | Whitfield | 340/949 |

FOREIGN PATENT DOCUMENTS 0437794 11/1935 United Kingdom ............... 340/949

OTHER PUBLICATIONS

Federal Triangle, *Washington Post*, 10-17-83, "FAA Plans to Buy Wind-Shear Alert Devices".

Primary Examiner—Joseph A. Orsino
Assistant Examiner—Brent A. Swarthout
Attorney, Agent, or Firm—George M. Cole

[57] ABSTRACT

Windshear indicator system comprised of a plurality of individual windshear detection and indication devices (10) disposed to one side of and parallel to the landing approach and takeoff areas of an airport runway. Each device (10) has a wind velocity sensor (24) and a wind direction indicator (22). Wind speed information is visually displayed in an array of vertical lights (30-40) of one color. A circular pattern of second colored lights (50-64) is provided so that the upper half of the pattern shows head winds and the lower half indicates or displays tailwinds to warn of a windshear condition. A green "go" light (74) flashes with the upper half of the circular lights (50-64). A red "no go" light (76) flashes with the lower half of the circular array of lights to warn of tailwinds and a windshear condition.

5 Claims, 2 Drawing Sheets

WINDSHEAR DETECTION INDICATOR SYSTEM

TECHNICAL FIELD

The invention relates to the field of climatic condition indicators for airports and airplanes and more particularly to a system for indicating wind and windshear conditions at airports such that the wind and windshear indication can be provided on the ground and displayed to the aircraft and/or transmitted from the field to an aircraft cockpit.

BACKGROUND ART

Windshear has always been a serious hazard in the aviation field as is evidenced by disastrous commercial aircraft crashes resulting in a tragic loss of life. The real danger is not when an aircraft is in flight. Rather the hazard is encountered when windshear occurs close to the ground, during landing approaches or on takeoff, that a crash can result. There are both angular and vertical windshears but they are related. Windshear occurs when cold upper air, sometimes with rain, gusts downward because of its heavier density in relation to lighter earth-warmed air at low elevations. Air has been found to gust down vertically at as much as 4000 feet per minute from distances of 2000 feet from the ground. As the gust reaches the ground it has to change direction and in an aircraft landing approach it becomes two horizontal winds rushing out in opposite directions. An aircraft flying through it first encounters a headwind providing good lift. It then in a very short space of time or distance encounters the opposite wind which is moving with the aircraft or a tail wind. If an aircraft is flying flaps down and near landing speed and encounters the tailwind, the pilot experiences a sudden loss of airspeed. If adjustments cannot be made quickly enough or if the plane is so heavily loaded or draggy that it cannot make rapid accommodations, it may crash. An example of this was Delta flight 191 crashing in August of 1985 at the Dallas airport killing 136 people.

Cold wind sometimes descends downwardly at an angle rather than strictly vertically. As the gusting wind reaches the earth it has to turn and its velocity is greatest in a horizontal direction away from the angle of descent. If the angle is steep, for example 30 degrees from the vertical, there will be some resultant back wind but, again, the horizontal wind velocity in the direction of the descent will be greatest. A dramatic instance of this occurred in Denver in 1975. The airplane began its takeoff with a quartering headwind of 10 to 20 knots. It then flew into a tailwind estimated at 60 to 90 knots. Clearly, power could not be applied fast enough and in about five seconds the airspeed decreased from 157 to 116 knots. The crew was unable to keep the craft aloft because of their inability to react quickly enough.

The short distance and brief time period within which windshears may be encountered has led to several different approaches to detect them.

On board instrumentation for detecting windshear on large commercial aircraft has been developed, but again warning of windshear conditions is given only a few seconds in advance of encountering the condition. Known instruments are not designed for small craft and airports do not provide windshear information. In short, no adequate system for detecting and providing windshear information to aircraft has been designed of which applicant is aware.

As a practical matter systems for real time detection systems currently in use at airports report only variations in wind velocity at the tower and not in approach areas Hence, the vagueness of tower warnings of possible windshear conditions.

The only art of which applicant is aware includes U.S. Pat. Nos. 4,318,076; 4,241,604; 1,953;159; 1,496,486; and 1,342,860. None of the listed patents is concerned with windshear as such. The prior art does teach the detection and warning of wind velocity and direction but it does not direct itself in any way to detection and warning of windshear.

SUMMARY OF THE INVENTION

The invention comprises a plurality or series of windshear indicators placed a predetermined distance apart from each other to one side and along the approach path to a landing strip or runway. Each indicator is provided with an anemometer and a wind direction sensor. The information from these two conventional instruments is utilized in the windshear indicator. A vertical array of colored lights will signal windspeed in incremental ranges. The wind direction information is provided to a circular array of lights. The top semicircular part informs an aircraft that the wind direction is lateral or frontal or quartering from the front. A green light in the semicircular display tells the pilot there is a headwind If the wind is angling in the direction of the landing path at least one of the lower array of lights in the indicator is lit to show an approximate wind angle. At least one light in the lower semi-circle of the array and a red center light warn pilots that a windshear condition exists Sufficient visual warning is given to allow the pilot to make the necessary control and power changes to combat the windshear condition.

Accordingly it is among the many features of the invention to provide a unique, simple and inexpensive system to give aircraft pilots ample lead time warning of windshear conditions. The system provides a visual on-ground reading for aircraft such as small and light planes as they begin their approach to touchdown on a runway. The indicators are such that electronic signalling of the ground conditions can also be transmitted to on-board cockpit read-out instruments to give the same display of information as is provided on the ground and tower in a visual display.

An electronic on-board signalling display from the field will give incoming or outgoing aircraft warning of windshear conditions at the airport many minutes and miles in advance of entering the landing approach or preparing for takeoff. This will allow the pilot ample opportunity to reroute the aircraft, cancel or postpone landing until weather conditions at the airport are acceptable. The indicators are ideally suited for small airports for turbulent air detection where wind socks are sometimes difficult to read and also because the stations are inexpensive and could be battery powered.

BEST MODE FOR CARRYING OUT THE INVENTION

Figure 2:
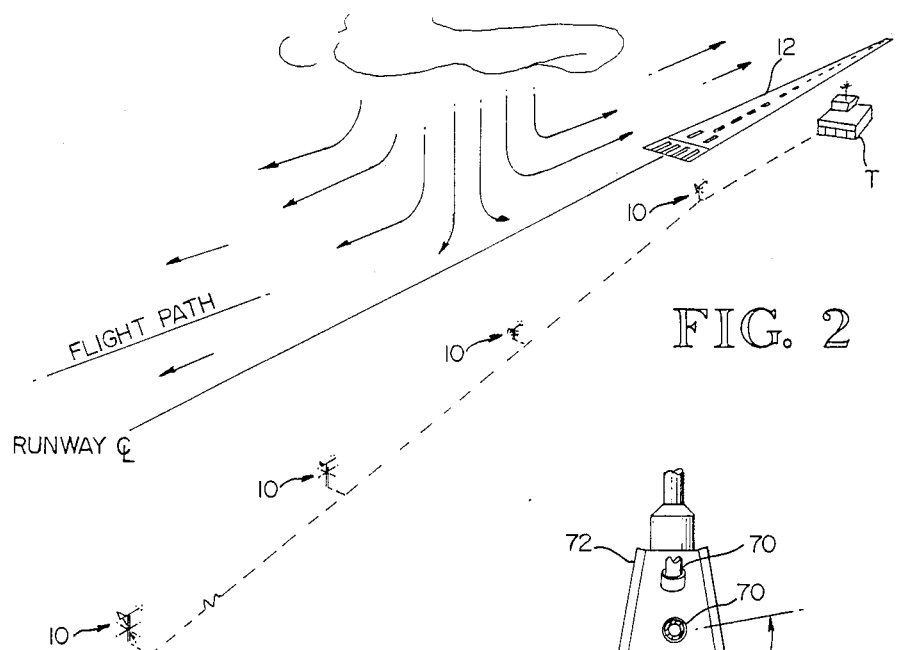
FIG. 2 is a perspective view showing schematically how a series of the indicators of FIG. 1 will be located on the approach path to the touchdown area of a runway.
Figure 4:
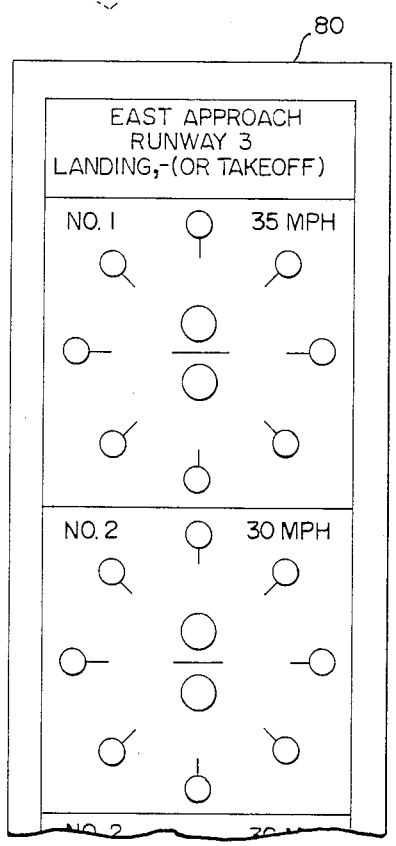
FIG. 4 is a partial view of a cockpit read-out display for on-board warning of wind and windshear conditions.

Referring now to the drawings it will be seen that the windshear indicator system of this invention has its location on either end of the approach path to a runway on opposite sides although only one is shown in the view of FIG. 2. Thus the devices are used by pilots on takeoff as well as on landing.

A series or plurality of windshear indicators, each generally designated by the number 10, are shown as aligned generally parallel to the side of an approach path for example to a runway 12. the interval or spacing between individual indicator devices 10 will vary but for illustrative purposes may be approximately ⅓ to ¾ miles apart. The spaced apart individual indicator station 10 senses or monitors wind direction and velocity in its zone or area. The series of indicators 10, numbering in most instances at least 3 to constitute a system, are installed for each runway approach and may and will number more stations. As can be appreciated the system will extend several miles into the approach path when deemed necessary to provide sufficient warning to an aircraft of a windshear condition. Thus the aircraft is permitted to make its control and/or power adjustments prior to encountering the windshear condition.

Figure 1:
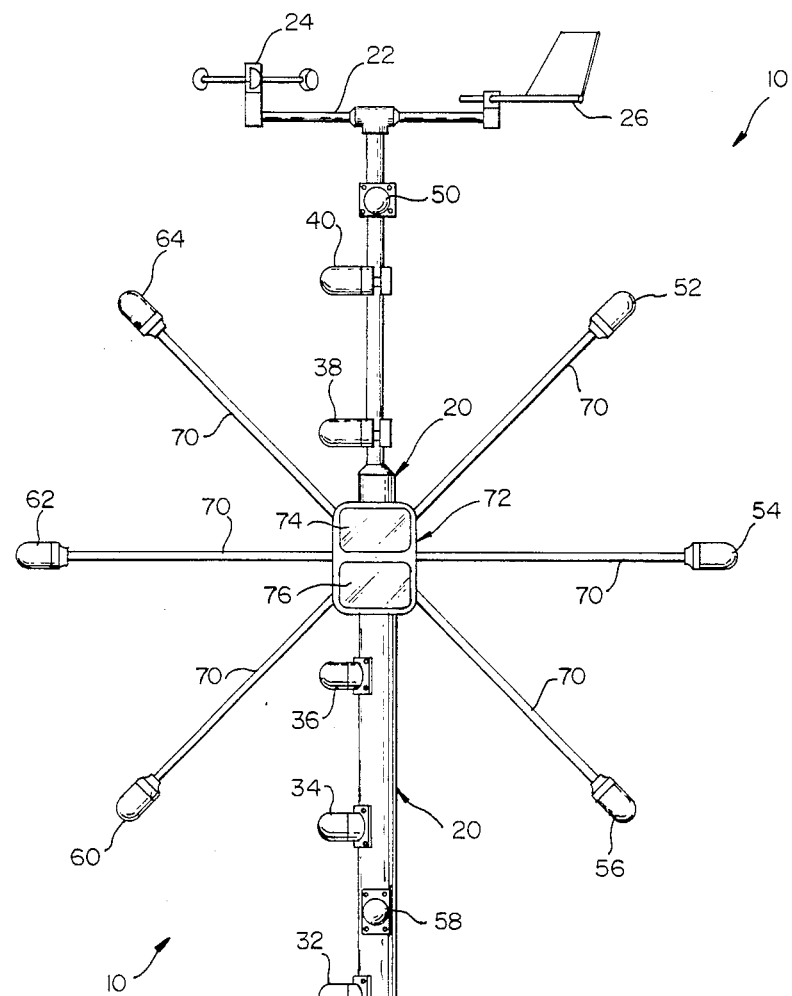
FIG. 1 is a front elevation view of an indicator of the invention showing the general structure and arrangement of parts.
Figure 1:
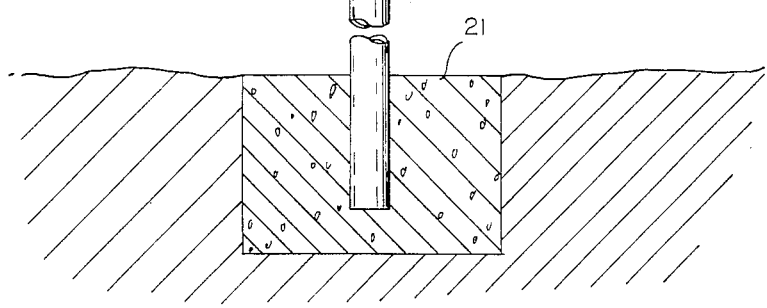
Figure 3:
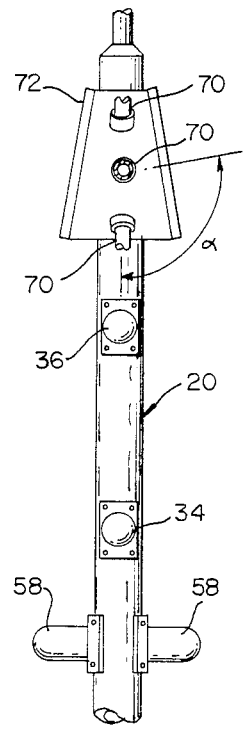
FIG. 3 is a partial side view in elevation showing additional details of construction of the indicator.

FIGS. 1 and 3 show the details of construction of the individual indicator stations as consisting of a vertical standard or pole generally designated by the number 20 and supported at its base in cement pad or block 21. At the top of the pole 20 is supported an elongated horizontal frame member 22 on which at one end is located a conventional or modified anemometer 24 for detecting wind velocity. At its other end is mounted a wind direction indicator 26 for sensing and providing the vital information as to whether wind is similar in direction the full length of an approach Mounted on pole or standard 20 are a plurality of spaced apart wind velocity lights serially numbered 30 through 40 as shown in FIG. 1 and for purposes of illustration may be colored blue. Light 30 may for instance indicate a windspeed of 5 to 10 or more miles per hour. Likewise wind velocity light 32 may indicate an additional incremental windspeed of 10 to 20 miles per hour. With all the vertical wind velocity lights on up to the top light 40 the wind speed will be shown to be 30 to 60 miles per hour. The increment of wind speed which each blue velocity light represents can be predetermined as desired. Wind velocity may optionally be indicated by rate or frequency of flash.

To visually display to aircraft approaching for landing or taking off the vital wind direction information is fed to a circular pattern of spaced apart amber or white wind direction lights, here serially numbered as 50 through 64 beginning at the top of the pattern. Wind direction lights 50 and 58 are shown to be mounted on pole 20, while lights 52, 54, 56, 60, 62 and 64 are mounted on radially extending arm members 70. Note that two of the arms 70 extend to either side horizontally to support lights 54 and 62 at diametrically opposed positions. As can be seen the light spacing is 45 degrees but may vary as desired.

At the center of the circular array and mounted on pole 20 is a weatherproof housing which as can be seen is shown to be rectangular but can be of any selected shape. The housing 72 has an upper portion thereof containing green light portion 74 and a lower red light portion 76. As can be seen green "go" light 74 is generally above the horizontal line defined by the diametrically opposed arm members 70 supporting wind direction lights 44 and 62. In like manner red "no go" light 76 is below the same horizontal line. The lights are installed in duplicate, that is on each side of the housing 72 and are angled slightly upwardly as seen in FIG. 3. In fact all lights on the station are displayed on both sides of the of the station to permit windshear information to be seen by aircraft using the runway from the opposite direction for takeoff when wind conditions demand.

In operation it will be appreciated that each individual indicator station 10 monitors wind velocity and wind direction and visually displays the information to pilots. For example, if the wind direction is a direct head wind to the aircraft's path, the direction light 50 will be flashing and green "go" light 74 will also be flashing. If the wind is quartering in frontally from the right at 45 degrees light 52 will flash along with light 74. If the wind is coming in at an angle between two lights, as for instance between direction lights 52 and 54 then both lights will flash along with "go" light 74. Accordingly, any light or combination of two lights indicating a favorable head wind condition will instantly flash with the "go" light to give an easily understood visual message to the aircraft pilot.

In like manner if an individual indicator station flashes its direction light 58 at the bottom of the circular array the pilot understands that a direct tailwind will be encountered in the zone monitored by that station. At the same time the red "no go" light 76 will also be flashing. Hence, a flashing wind direction light or pair of lights in the lower half of the circular pattern indicates a tailwind condition and the red light 76 flashes also.

It will be appreciated that information from the anemometer 24 and direction monitor 26 are supplied not only to the visual light means at each station but may also be transmitted to the airport tower T to a wind display for each indicator station in the approach and landing paths. The receiver/read-out instruments generally designated by the number 80 would constitute small scale or miniaturized electronic replicas of each of the stations 10. In this way the tower would have visual read out for each station regardless of visibility conditions on the field. The small scale instruments may also be installed in the cockpits of aircraft, particularly commercial planes, so that many miles or minutes before the aircraft is in a dangerous windshear situation the pilot can read the windshear monitor and if any red lights are on at any of the several indicator stations he will have sufficient and ample warning to make adjustments in power and/or controls, reroute, cancel or postpone a landing until weather permits. At the tower a video camera can record all data as displayed by the readout instruments for future review.

It will be appreciated that this on-ground windshear information system can be transmitted to an aircraft's own display instrument, can be radioed from the tower or visually observed. It will be understood that the indicator monitor stations, besides being located at airports and supported in the ground, can attach on top of or attach to a suitable structure or support. They could also be waterborne on a well-ballasted, directionally stabilized and anchored buoy. The stations can also be mounted vertically as illustrated, inclined or horizontal with appropriate structural modifications.

I claim:

1. Windshear detection and indication system for airports, comprising:
   (a) a plurality of wind indicator devices provided to the side and generally parallel to the approach and takeoff path of a runway for airplanes, said plurality of indicators being spaced a predetermined distance apart to detect wind conditions in its area;
   (b) each said indicator device consisting of a generally upright pole of predetermined height and supported so as to be visible to aircraft using said runway,
   (c) said pole including a series of first lights of one color disposed vertically in spaced apart relationship such that each of said first lights represents an increment of wind speed,
   (d) said pole also including a plurality of second lights of a different color and disposed in a circular spaced apart pattern, a predetermined number of which being supported on radially disposed arms, and on said pole, said plurality of second lights including two of said lights being horizontally diametrically opposed to define two upper quadrants and two lower quadrants in said circular pattern so that wind direction from the side or from the front of an aircraft's path is indicated by said second lights at the horizontal or above in the upper two quadrants, and so that wind direction from the rear of an aircraft's path is indicated by second lights at the horizontal or below in the lower two quadrants,
   (e) a green light means attached to said pole in the upper two quadrants to indicate with said second lights above the horizontal that wind direction is favorable,
   (f) a red light means attached to said pole in the lower two quadrants to indicate with said second lights below the horizontal that wind direction is or angles from the rear of an aircraft's path to indicate that a tailwind condition exists, and
   (g) anemometer and wind direction indicator means on said pole to provide information to said first and second light means thereon.

2. The windshear detection and indication system according to claim 1 and wherein on each of said plurality of indicator devices said second lights are spaced from each other at about 45 degree intervals.

3. The windshear detection and indication system according to claim 1 and wherein said series of first lights indicate wind speed in increments of a minimum of five miles per hour beginning with the bottom light of said series.

4. The windshear detection and indication system according to claim 1 and wherein said plurality of wind indicator devices number at least three.

5. The windshear detection and indication system according to claim 1 and wherein said plurality of wind indicator devices are disposed at spaced apart intervals of at least ⅛ of a mile.

* * * * *